Aug. 2, 1966     M. D. RICKARD     3,263,977
RECTANGULAR GAS AND LIQUID CONTACT BED HAVING
A LIQUID DISTRIBUTOR
Filed Sept. 23, 1963
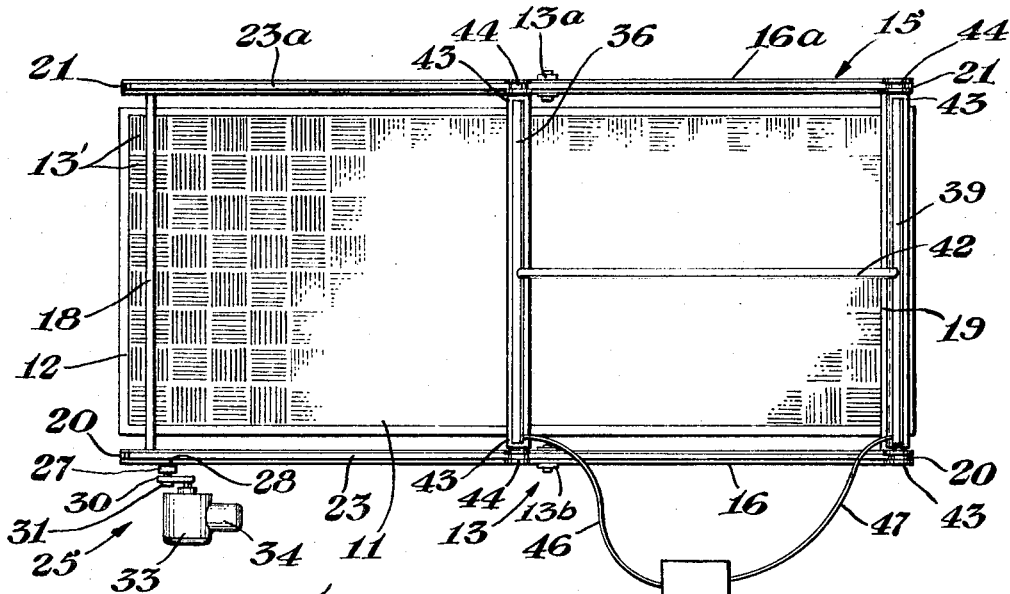
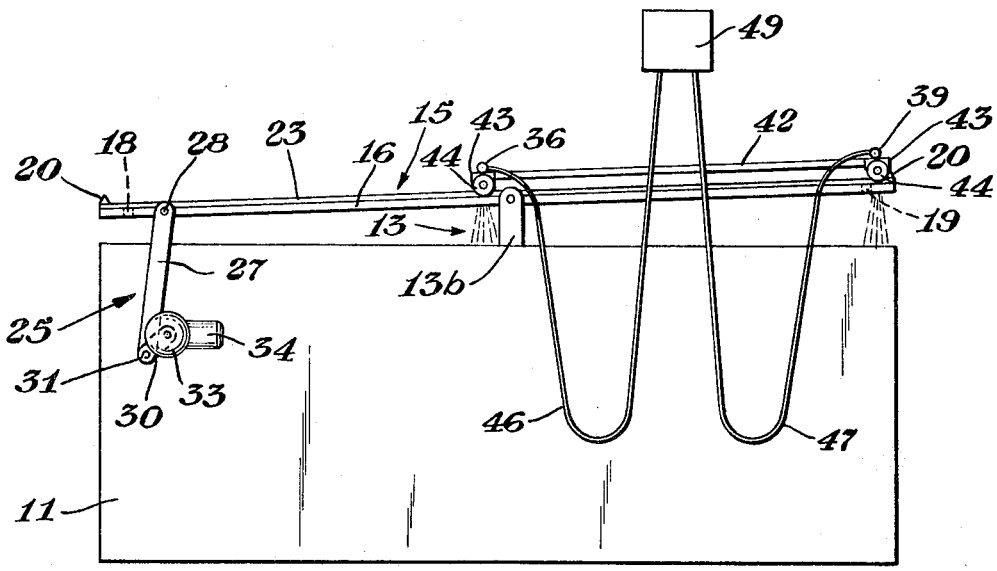
INVENTOR.
Melvin D. Rickard
BY
Robert B...
AGENT

United States Patent Office 3,263,977
Patented August 2, 1966

3,263,977
RECTANGULAR GAS AND LIQUID CONTACT BED HAVING A LIQUID DISTRIBUTOR
Melvin David Rickard, Midland, Mich., assignor to The Dow Chemical Company, Midland, Mich., a corporation of Delaware
Filed Sept. 23, 1963, Ser. No. 310,538
6 Claims. (Cl. 261—112)

This invention relates to a liquid distributor and more particularly relates to a liquid distributor particularly adapted to be employed with rectangular liquid treating units.

In the treatment of volumes of liquid, particularly water, containing undesired organic material, usually generally cylindrical beds are employed wherein a support member is provided, such as crushed rock. The water or similar liquid is applied to the rock within the cylindrical beds. As it trickles over the surface, the waste organic materials are usually oxidized by biological means. Such cylindrical beds are usually in the form of short, disc-like cylinders which employ a centrally disclosed spray head or rotatable distributor arms having spray heads attached thereto to provide a uniform distribution of the liquid over the support medium.

Various economic considerations indicate that it would be extremely desirable to utilize generally rectangular or square beds as such forms often are easier to construct and may be assembled by personnel less highly skilled than those who prepared the cylindrical structures. Further, many modern biological oxidation support media which are presently available are more efficiently and easily positioned within a rectangular bed than a circular bed. Typical of these media are those employing a plurality of corrugated sheets in spaced relationship to each other and assembled into a bundle which has a generally rectangular form.

It is, therefore, an object of this invention to provide an improved liquid distribution system for biological oxidation media when assembled in a rectangular bed.

A further object of this invention is to provide a distribution system which will substantially uniformly distribute the liquid over the oxidation medium.

Another object of the invention is to provide a distributor system which can be simply and easily maintained.

These benefits and other advantages, in accordance with the invention, are readily achieved by providing in cooperative combination with a rectangular bed having therein a gas-liquid contact medium and an open top adapted to receive falling liquid, liquid distributor comprising means to provide a source of liquid to be distributed, a frame generally co-extensive with the rectangular area to receive the liquid, said frame being pivotally mounted above the open top of the rectangular bed, means to oscillate the frame about said pivot in such a manner that the plane of the frame passes through a horizontal plane and is displaced therefrom by about an equal angular displacement above and below a horizontal plane, at least one means adapted to provide a generally linear spray supported upon said frame, the means to provide the spray being slidably mounted on the frame and adapted to move to and fro under the influence of gravity as the frame is oscillated about the pivot and means to provide a path from the liquid source to the means to provide the liquid spray.

Further features and advantages of the invention will become more apparent from the following specification when taken in connection with the drawing wherein:

FIGURE 1 is a schematic represenation of an installation in accordance with the invention.

FIGURE 2 is a top view of the apparatus of FIGURE 1.

In FIGURE 1 there is illustrated an installation in accordance with the present invention generally designated by the reference numeral 10. The installation 10 comprises a bed 11 having a generally rectangular form. The bed 11 has an open, generally rectangular, top 12. Within the bed 11 are disposed a plurality of bundles or packing 13' of a biological oxidation medium. The bed 11 provided with a generally centrally disposed pivot means 13 which consists of trunnions 13a and 13b disposed on opposite sides of the bed 11. Pivotally attached to the trunnions 13a and 13b is a frame 15. The frame 15 comprises longitudinal side members 16 and 16a. The side members 16 and 16a are joined at opposite ends by means of the cross members 18 and 19. The side members 16 and 16a defined stops 20 and 21, respectively. The side members 16 and 16a have affixed thereto track portions 23 and 23a respectively, extending substantially their entire length. An oscillating means 25 is operatively connected to the frame 15. The oscillating means 25 comprises a connecting rod 27 pivotally attached to the frame member 16 by means of the pivot 28. The end of the connecting rod 27 remote from the pivot 28 is connected to a crank member 30 by means of the pivot 31. The crank member 30 is rotated by means of the reduction gear 33 which, in turn, is driven by the motor 34. Slidably mounted on the frame 15 is the distributing head 35. The distributing head 35 comprises a manifold 36 defining a plurality of spray openings not shown, which emit the spray 38. In generally parallel relationship to the manifold 36 is a second manifold 39, the second similar manifold 39 forming a plurality of spray apertures and delivering the spray 40. The manifolds 36 and 39 are rigidly maintained in spaced relationship by a spacing means 42. Each of the manifolds 36 and 39 is supported on the frame 15 by the trucks 43. The trucks 43 are rigidly affixed to the manifold 36 in such a manner that a wheel 44 is positioned to roll smoothly upon the side members 16 and 16a, permitting a longitudinal motion of the distributor head 15. A pair of flexible feed hoses 46 and 47 is in full communication with the manifolds 36 and 39, respectively. The terminal portions of the flexible feed hoses 46 and 47 are in communication with a head box 49 which is attached to provide a constant head of liquid being forced into the manifolds 36 and 39. The head box 49 is in communication with a feed source not shown.

In operation of the distributor of the present invention, a liquid to be distributed over the packing 13' is provided to the head box 49. From the head box 49, it flows through the flexible lines 46 and 47 to the manifolds 36 and 39, respectively. The liquid is discharged as a generally linear spray from the manifolds 36 and 39. Rotation of the crank 30 by means of the gear box 36 and motor 34 causes the connecting rod 27 to impart an oscillating motion to the frame 15. As the frame 15 is caused to pivot about the pivots 13, the force of gravity causes the distributor assembly 15 to roll toward the portion of the frame which is below the horizontal. As the crank 30 rotates, the lower portion is raised and the distributor assembly is caused to move to the opposite extreme. The stops 20 and 21 provide a limit to the distance which the distributor head may travel. By suitable adjustment of the speed of rotation of the crank 30, a relatively constant distribution of the liquid over the surface of the packing within the bed is achieved. Usually, it is desirable to adjust the rotational speed of the crank 30 and, hence the rate of oscillation in such a manner that the rate of travel of the distributor head is limited as it approaches the end stop. That is, it is desirable that the end portion of the frame, for example, the stop 20 should be at or near its maximum height as the distributor head approaches. Thus, the gravity imparts motion to the distributor head when the stop 20 is in its lower position. It accelerates and as the stop 20 is raised above the horizontal, the distributor head will decrease in velocity and ideally can be made to reverse its direction just before contacting the stop. Thus, the apparatus can work quietly and with a minimum of mechanical wear and a considerable lessening of the impact.

As is apparent, the apparatus is susceptible of being embodied with various alterations and modifications from that which is being described in the preceding description and specification. For this reason, it is to be understood that all of the foregoing is merely intended to be illustrative and is not to be construed or interpreted as being restrictive or otherwise limitative of the present invention except as set forth in the appended claims.

What is claimed is:

1. In cooperative combination with a rectangular bed having therein a gas-liquid contact medium and an open top to receive a falling liquid, a liquid distributor comprising means to provide a source of liquid to be distributed, a frame generally coextensive with the rectangular bed to receive the liquid, said frame being pivotally mounted above the open top of the rectangular bed, means to oscillate said frame about said pivot in such a manner that the plane of the frame passes through a horizontal plane and is displaced therefrom by about an equal angular displacement above and below a horizontal plane, at least one means adapted to provide a generally linear spray supported upon said frame, said means to provide the spray being slidably mounted on the frame and adapted to move to and fro under the influence of gravity as the frame is oscillated about the pivot, means to provide liquid from the liquid source to the means to provide a spray, means to provide a path for the liquid from the liquid source to the means to provide a liquid spray.

2. The apparatus of claim 1 wherein the frame is pivotally mounted at about the center thereof.

3. The apparatus of claim 2 wherein the means to provide a liquid spray comprises at least two generally linear elements in fixed spaced relationship to each other.

4. The apparatus of claim 1 wherein a portion of the upper surface of said frame defines a track and the means to provide the liquid spray is supported thereon by wheels.

5. The apparatus of claim 3 wherein the liquid distributor is connected to the means to provide a spray by a flexible hose.

6. In cooperative combination a rectangular bed having an open generally horizontally positioned top and a gas-liquid contact medium disposed therein, said gas-liquid contact medium comprising a plurality of sheets in generally parallel relationship to each other and each of said sheets disposed in a generally vertical plane, the rectangular bed being adapted to receive a falling liquid spray, a liquid distributor comprising a source of liquid to be distributed in operative communication with a means to provide a source of liquid to be distributed, a generally rectangular frame, the frame being generally coextensive with the rectangular bed to receive the liquid, means pivotally mounting the frame above the open top of the rectangular bed, said pivot means comprising a pair of generally coaxial pivots generally centrally disposed with respect to the upper edges of opposite walls of the rectangular bed, in cooperative combination with the frame a means to oscillate the frame above and below a horizontal plane passing through the pivots, and said frame adapted to oscillate through an angular displacement above and below the horizontal plane by about an equal angular displacement, at least two generally linear spray devices extending between the sides of the frame attached to the pivots, said spray devices being in fixed spaced relationship to each other, and said spray devices adapted to move under the influence of gravity along the frame and being supported thereon by means of a plurality of wheel members, at the portions of said frame remote from the pivots a stop means to limit the travel of the spray devices.

References Cited by the Examiner

UNITED STATES PATENTS 3,109,876   11/1963   Moeller             261—112

FOREIGN PATENTS 1,159,275   2/1958   France.
5,445   1906   Great Britain.
556,565   2/1957   Italy.

HARRY B. THORNTON, *Primary Examiner.*

R. R. WEAVER, *Assistant Examiner.*